(12) United States Patent
Wood et al.

(10) Patent No.: US 11,284,971 B2
(45) Date of Patent: Mar. 29, 2022

(54) DENTURE RETENTION APPARATUS AND METHOD

(71) Applicant: New Way Denture & Retention Systems, LLC, Dalton, GA (US)

(72) Inventors: Lawrence Richard Wood, Dalton, GA (US); Gregory Byron Evans, McDonald, TN (US); Anthony Leroy Henry, Cohutta, GA (US)

(73) Assignee: New Way Denture & Retention Systems, LLC, Dalton, GA (US)

( * ) Notice: Subject to any disclaimer, the term of this patent is extended or adjusted under 35 U.S.C. 154(b) by 0 days.

(21) Appl. No.: 17/183,756

(22) Filed: Feb. 24, 2021

(65) Prior Publication Data

US 2021/0267728 A1    Sep. 2, 2021

Related U.S. Application Data

(60) Provisional application No. 62/982,228, filed on Feb. 27, 2020.

(51) Int. Cl.
*A61C 8/00* (2006.01)

(52) U.S. Cl.
CPC .......... *A61C 8/0095* (2013.01); *A61C 8/0062* (2013.01)

(58) Field of Classification Search
CPC ....... A61C 8/00; A61C 8/0048; A61C 8/0095; A61C 8/0053; A61C 8/0062; A61C 8/005; A61C 13/01; A61C 13/225; A61C 13/275
USPC .................................................. 433/172–174
See application file for complete search history.

(56) References Cited

U.S. PATENT DOCUMENTS

| | | | |
|---|---|---|---|
| 1,749,493 A | | 3/1930 | Lasky |
| 1,990,532 A | | 2/1935 | Ecker |
| 2,775,816 A | | 1/1957 | Crevison |
| 3,656,236 A | | 4/1972 | Kurer |
| 4,540,367 A | | 9/1985 | Sulc |
| 4,661,068 A | | 4/1987 | Harrison et al. |
| 4,715,817 A | | 12/1987 | Zuest et al. |
| 4,767,329 A | | 8/1988 | Schiwiora et al. |
| 5,049,075 A | | 9/1991 | Barrut |
| 5,234,341 A | * | 8/1993 | Johansen ............. A61C 13/273 433/172 |
| 5,427,906 A | * | 6/1995 | Hansen ................ A61C 8/0048 433/173 |
| 5,716,214 A | * | 2/1998 | Lund .................... A61C 8/0048 433/173 |

(Continued)

FOREIGN PATENT DOCUMENTS

| | | | | |
|---|---|---|---|---|
| EP | 2626035 A1 | * | 8/2013 | ........... A61C 8/0089 |
| WO | WO-8300996 A1 | * | 3/1983 | ......... A61C 13/2255 |

OTHER PUBLICATIONS

Invitation to Pay Additional Fees dated Apr. 13, 2021 regarding PCT App. No. PCT/US2021/019360 filed Feb. 24, 2021.

(Continued)

*Primary Examiner* — Nicholas D Lucchesi
*Assistant Examiner* — Mirayda A Aponte
(74) *Attorney, Agent, or Firm* — Robinson IP Law, PLLC

(57) ABSTRACT

A denture abutment retention apparatus and a denture including one or more denture abutment retention apparatuses configured to allow the denture to be easily engaged with and secured to a plurality of denture abutments in a user's mouth using sliding motion of the denture from the sides of the plurality of denture abutments.

9 Claims, 12 Drawing Sheets

(56) References Cited

U.S. PATENT DOCUMENTS

| | | |
|---|---|---|
| 6,981,871 B2 | 1/2006 | Mullaly et al. |
| 7,234,940 B2 | 6/2007 | Weissman |
| 7,985,071 B2 | 7/2011 | Weissman |
| 8,926,325 B2 | 1/2015 | Berger |
| 8,926,326 B2 | 1/2015 | Shepard |
| 8,992,221 B2 | 3/2015 | Bolleter |
| 9,554,879 B2 | 1/2017 | Harrison |
| 9,801,699 B2 | 10/2017 | Okay |
| 9,883,926 B2 | 2/2018 | Haralampopoulos et al. |
| 2008/0038694 A1 | 2/2008 | Tache et al. |
| 2009/0263761 A1 | 10/2009 | Shepard |
| 2010/0055645 A1 | 3/2010 | Mullaly et al. |
| 2011/0065064 A1 | 3/2011 | Kahdemann et al. |
| 2012/0094253 A1 | 4/2012 | Berger |
| 2013/0323679 A1 | 12/2013 | Berger |
| 2016/0361144 A1 | 12/2016 | Wang |

OTHER PUBLICATIONS

International Search Report and Written Opinion of the International Searching Authority, PCT App. No. PCT/US2021/019360, dated Jul. 13, 2021.

\* cited by examiner

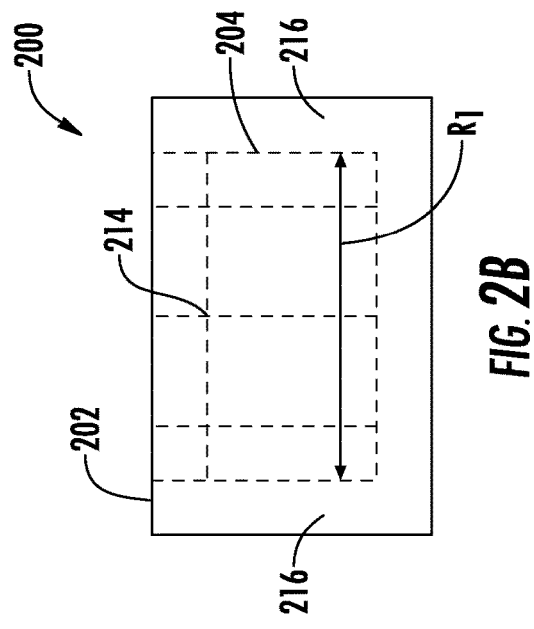
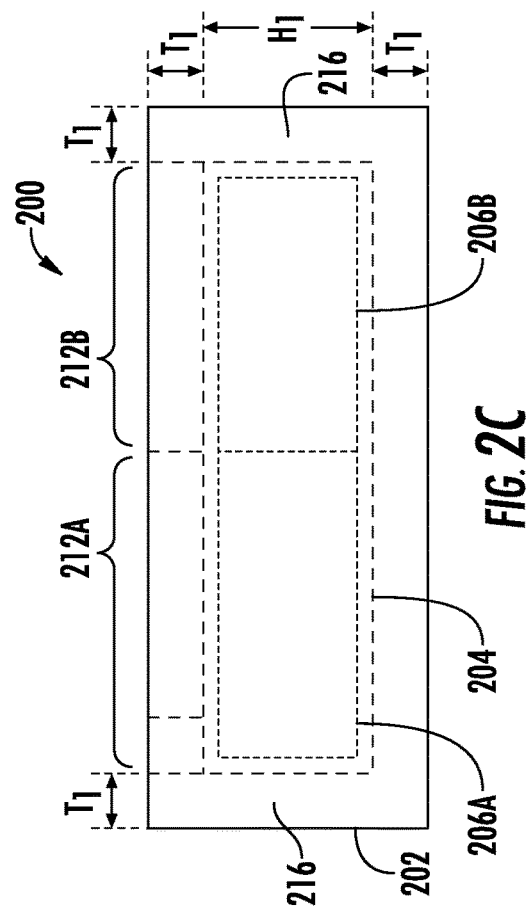
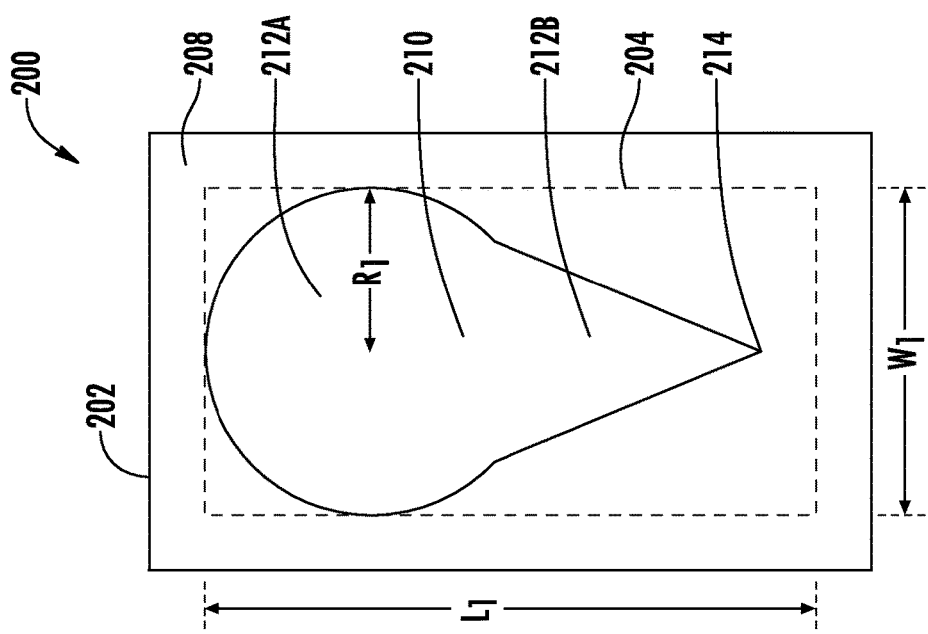
FIG. 2B
FIG. 2C
FIG. 2A

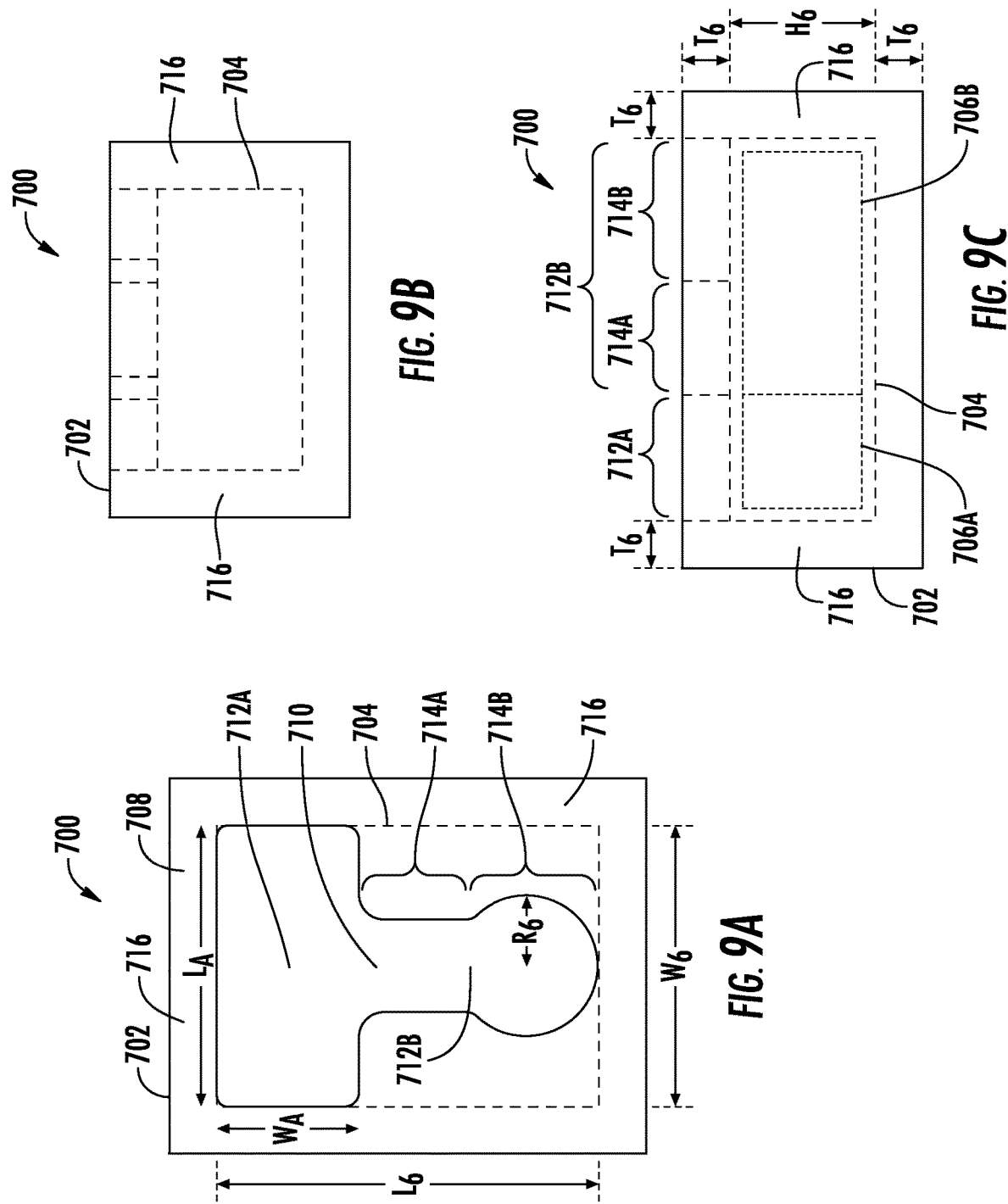

DENTURE RETENTION APPARATUS AND METHOD

PRIORITY

This application is a nonprovisional application which claims priority to U.S. Provisional Application Ser. No. 62/982,228 entitled "Denture Retention Apparatus and Method" which was filed on Feb. 27, 2020, the entirety of which is incorporated herein by reference.

FIELD

This disclosure relates to the field of dentures. More particularly, this disclosure relates to apparatuses and mechanisms for attaching dentures to denture abutments.

BACKGROUND

Traditional implant-retained dentures (or "hybrid-type dentures") are a type of denture used in the dental arts which require a patient to have multiple appointments to "try-in" the denture at various stages of development. The repeated "try-ins" are partially due to the need for milling an expensive titanium bar or using expensive zirconia which is labor-intensive and, on occasion, can crack. A dentist is required to thoroughly clean such dentures because only a dentists can properly remove such dentures, clean them and reinsert and attach them. Without a dentist appointment for such cleaning, a user is relegated to cleaning around the dentures but not thoroughly cleaning them.

What is needed, therefore, is a denture apparatus that does not require as many dental visits or the expensive components used in traditional implant-retained dentures. More specifically. What is also needed is a denture that can be removed and reinserted and attached by a user without the need for a dental appointment and the help of a dental professional.

SUMMARY

The above and other needs are met by an apparatus to retain a removable implant supported denture in place with a more substantial mechanical lock and physical retention than prior art devices. Embodiments of the apparatus described herein offer benefits over current systems including conventional dentures, implant-supported over-denture attachment, and traditional implant retained dentures (also known as hybrid-type dentures). Embodiments of the proposed apparatus provide benefits to patients and an easier production process for dentists and laboratories.

Generally speaking, embodiments of the apparatus use a horizontal insertion and removal process (slides into place) compared to the vertical insertion and removal process of existing implant-supported denture systems. Since implant supported dentures are simply snapped into place, they can be loosened by chewing motions. The horizontal locking mechanism of embodiments described herein securely locks a denture in place preventing the denture from slipping or moving during typical chewing and talking.

In one aspect, a denture abutment retention apparatus for securing a denture to a denture abutment is disclosed, the apparatus comprising a denture abutment retention apparatus body comprising a plurality of sides wherein the plurality of sides include a first side which comprises an aperture therethrough; a channel located inside the denture abutment retention apparatus body and open to the first side of the denture abutment retention apparatus body via the aperture, the channel further comprising a first zone and a second zone, and the aperture further comprising a first section and a second section wherein the first section is wider than the second section; wherein the aperture and channel are configured to (i) allow a head of a dental abutment to fit through the first section of the aperture and into the first zone of the channel, (ii) allow a head of a dental abutment to be slid to the second zone of the channel under the second section of the aperture, and (iii)prevent a head of a dental abutment from fitting through the second section of the aperture to escape the channel.

In one embodiment, the first section of the aperture comprises a round shape and the second section of the aperture comprises a triangular shape terminating at a point to allow a neck of a dental abutment to be wedged into the denture abutment retention apparatus body along the second section of the aperture after being inserted into the first section of the aperture and slid toward the second section of the aperture.

In another embodiment, the first section of the aperture comprises a round shape and the second section of the aperture comprises a tapered shape terminating at a rounded end. In one embodiment, a distal portion of the second zone of the channel angles out on opposing sides at an angle α for receiving a head of a cone-type dental abutment.

In another embodiment, the second section of the aperture further comprises a first region and a second region wherein the first region is narrower than the second region so that a neck of a dental abutment can snap through the first region into the second region when the denture abutment retention apparatus is being secured to a dental abutment.

In another embodiment, the second section of the aperture further comprises a first region and a second region wherein the first region is narrower than the second region so that a neck of a dental abutment can pass through the first region into the second region when the denture abutment retention apparatus is being secured to a dental abutment, and wherein the second zone of the channel provides extra space for freedom of movement for a head of a dental abutment located in the second zone of the channel. In one embodiment, the first section of the aperture comprises a rectangular shape through which the head of a T-shaped dental abutment can be inserted into the first zone of the channel. In one embodiment, the second region of the second section of the channel aperture comprises a round shape.

In another aspect, a denture abutment retention apparatus is disclosed comprising a base; a neck including a first neck end and a second neck end wherein the neck is connected to the base along the first neck end; a pair of arched arms connected to and extending from the neck, the pair of arched arms comprising a first arched arm including a first arched arm distal end and a second arched arm including a second arched arm distal end wherein the pair of arched arms form an empty space between the first arched arm and the second arched arm and a gap between the first arched arm distal end the second arched arm distal end. In one embodiment, the empty space is configured for receiving a head of a denture abutment and wherein the gap is configured for receiving a neck of a denture abutment so as to confine the denture abutment in the denture abutment retention apparatus.

In another aspect, a denture is disclosed comprising a denture body, a first denture abutment retention apparatus connected to the denture body, and a second denture abutment retention apparatus connected to the denture body wherein each of the first denture abutment retention apparatus and the second denture abutment retention apparatus comprises: a denture abutment retention apparatus body comprising a plurality of sides wherein the plurality of sides include a first side which comprises an aperture therethrough; a channel located inside the denture abutment retention apparatus body and open to the first side of the denture abutment retention apparatus body via an aperture, the channel further comprising a first zone and a second zone, and the channel aperture further comprising a first section and a second section wherein the first section is wider than the second section; wherein the aperture and the channel are configured to (i) allow a head of a dental abutment to fit through the first section of the aperture into the first zone of the channel, (ii) allow a head of a dental abutment to be slid to the second zone of the channel under the second section of the aperture, and (iii) prevent a head of a dental abutment from fitting through the second section of the aperture to escape the channel. Preferably, the first denture abutment retention apparatus and the second denture abutment retention apparatus are at least partially embedded in a posterior section of the denture body. The denture preferably further comprises a third denture abutment retention apparatus connected to the denture body and a fourth denture abutment retention apparatus connected to the denture body wherein each of the third denture abutment retention apparatus and the fourth denture abutment retention apparatus comprises a base; a neck including a first neck end and a second neck end wherein the neck is connected to the base along the first neck end; and a pair of arched arms connected to and extending from the neck, the pair of arched arms comprising a first arched arm including a first arched arm distal end and a second arched arm including a second arched arm distal end wherein the pair of arched arms form an empty space between the first arched arm and the second arched arm and a gap between the first arched arm distal end the second arched arm distal end. Preferably, the third denture abutment retention apparatus and the fourth denture abutment retention apparatus are at least partially embedded in an anterior section of the denture body. The denture preferably includes an open center section. Preferably, the denture does not include a flange on a lingual side of the denture.

In another aspect, a denture is disclosed comprising a denture body, a first denture abutment retention apparatus connected to the denture body, and a second denture abutment retention apparatus connected to the denture body wherein each of the first denture abutment retention apparatus and the second denture abutment retention apparatus comprises a base; a neck including a first neck end and a second neck end wherein the neck is connected to the base along the first neck end; and a pair of arched arms connected to and extending from the neck, the pair of arched arms comprising a first arched arm including a first arched arm distal end and a second arched arm including a second arched arm distal end wherein the pair of arched arms form an empty space between the first arched arm and the second arched arm and a gap between the first arched arm distal end the second arched arm distal end. Preferably, the first denture abutment retention apparatus and the second denture abutment retention apparatus are at least partially embedded in the denture body. The denture preferably includes an open center section. Preferably, the denture does not include a flange on a lingual side of the denture.

In another aspect, a denture abutment retention apparatus for securing a denture to a T-shaped dental abutment is disclosed, the apparatus comprising a denture abutment retention apparatus body; a cavity located inside the denture abutment retention apparatus body and open to a first side of the denture abutment retention apparatus body via a first opening and open to a second side of the denture abutment retention apparatus body via a second opening; wherein the cavity is sized and shaped (i) to allow a head of a T-shaped dental abutment to fit into the cavity through the second opening and (ii) to allow a neck portion of a T-shaped dental abutment to fit into and be slid into the first opening, securing a T-shaped dental abutment to the denture abutment retention apparatus body. Preferably, the denture abutment retention apparatus body further comprises a threshold extending out beyond the first opening.

In another aspect, a method for attaching a denture to a denture abutment is disclosed, the method comprising the step of attaching a denture abutment retention apparatus to a denture to form a dental apparatus, wherein the denture abutment retention apparatus comprises (i) a denture abutment retention apparatus body; and (ii) a channel located inside the denture abutment retention apparatus body and open to a first side of the denture abutment retention apparatus body via a channel aperture, the channel further comprising a first zone and a second zone, and the channel aperture further comprising a first section and a second section wherein the first section is wider than the second section wherein the channel is sized and shaped (1) to allow a head of a dental abutment to fit into the first zone of the channel through the first section of the channel aperture, (2) to allow a head of a dental abutment to be slid to the second zone of the channel under the second section of the channel aperture, and (3) to prevent a head of a dental abutment from fitting through the second section of the channel aperture. The attaching step preferably further comprises the steps of a. positioning the first section of the channel aperture over a dental abutment in a user's mouth; b. moving the dental apparatus so that a head of the dental abutment is inserted into the first zone of the channel; c. sliding the dental apparatus toward the back of a user's mouth so that a neck of the dental abutment slides to a second section of the channel aperture and so that the head of the dental abutment slides to the second zone of the channel, thereby securing the dental apparatus to the dental abutment.

In another aspect, a method for making a denture including denture abutment retention apparatuses described herein is disclosed. The method includes solidifying an acrylic composition around a plurality of denture abutment retention apparatuses as shown and described herein wherein first sides and associated apertures of the denture abutment retention apparatuses are exposed. In another embodiment, cavities are left in the acrylic of a denture body wherein the denture abutment retention apparatuses are inserted into the cavities and attached to the denture using an adhesive or other mechanical attachment means. A method for making a denture including denture abutment retention apparatuses described herein includes solidifying an acrylic composition in the shape of a denture with a plurality of cavities in the solidified acrylic composition; attaching denture abutment retention apparatuses in the cavities with one denture abutment retention apparatus per cavity.

The summary provided herein is intended to provide examples of particular disclosed embodiments and is not intended to cover all potential embodiments or combinations of embodiments. Therefore, this summary is not intended to limit the scope of the invention disclosure in any way, a function which is reserved for the appended claims.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIG. 2A shows a drawing of a plan view of a denture abutment retention apparatus;

FIG. 2B shows a drawing of an end view of the denture abutment retention apparatus shown in FIG. 2A;

FIG. 2C shows a drawing of a side view of the denture abutment retention apparatus shown in FIG. 2A and FIG. 2B;

FIG. 9A shows a drawing of a plan view of denture abutment retention apparatus;

FIG. 9B shows a drawing of an end view of the denture abutment retention apparatus shown in FIG. 9A;

FIG. 9C shows a drawing of a side view of the denture abutment retention apparatus shown in FIG. 9A and FIG. 9B;

The figures are provided to illustrate concepts of the invention disclosure and are not intended to embody all potential embodiments of the invention. Therefore, the figures are not intended to limit the scope of the invention disclosure in any way, a function which is reserved for the appended claims.

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Figure 1:
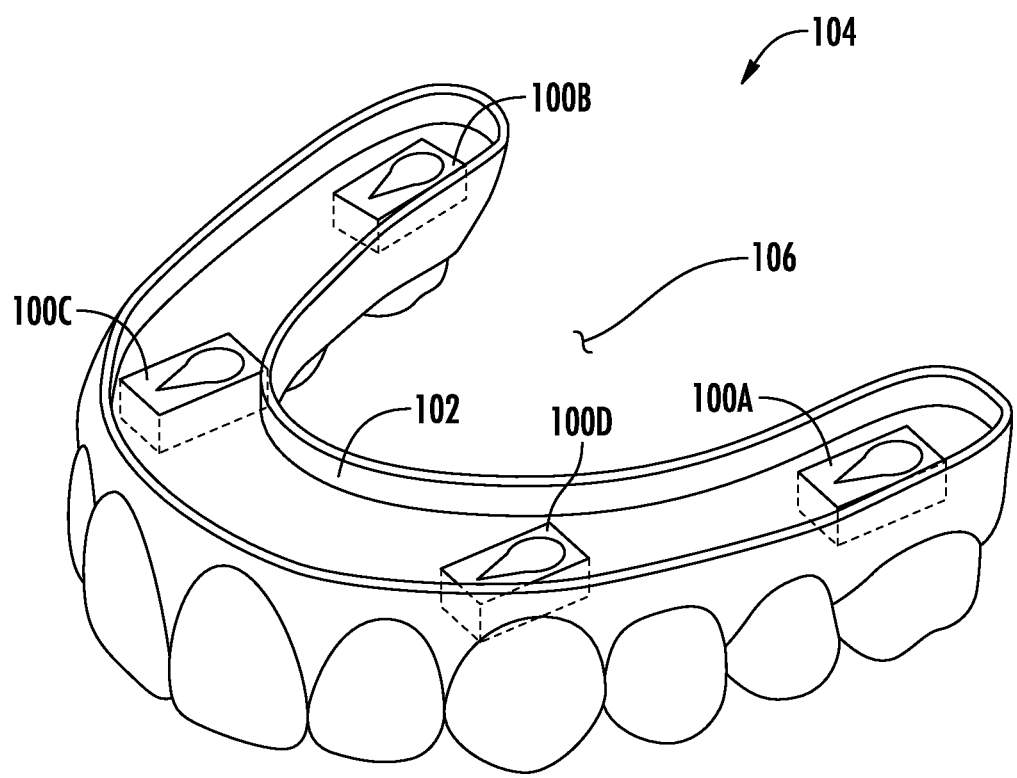
FIG. 1 shows a drawing of a set of four denture abutment retention apparatuses attached to a denture, thereby forming a dental apparatus for engagement with abutments in a user's mouth.
Figure 3:
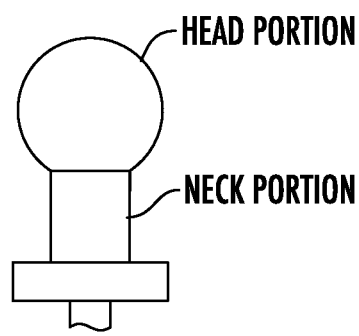
FIG. 3 shows side view of a common dental abutment that can be used along with the denture abutment retention apparatus shown in FIGS. 2A-2C.

FIG. 1 shows a denture abutment retention apparatus 100A attached to or otherwise formed in a denture 102 forming a dental apparatus 104. The denture abutment retention apparatus 100A may come in different forms to suit different types of dental abutments. FIGS. 2A-2C show different views of a denture abutment retention apparatus 200 including a denture abutment retention apparatus body 202 and a channel 204 located therein. The channel 204 includes a first zone 206A and a second zone 206B. The channel 204 is open to a first side 208 of the denture retention apparatus body 202. The first side 208 includes an aperture 210 that provides access to the channel 204. The aperture 210 includes a first section 212A and a second section 212B. The sizing of the aperture 210 is such that a head of a dental abutment can fit through the first section 212A but cannot fit through some or all of the second section 212B. FIG. 3 shows an example of a dental abutment including a head portion and a neck portion. Dental abutments are preferably secured into the mouth of a user by a dental professional and then can be used to attach dentures thereto. Traditionally, this is done using a vertical attachment mechanism in which dentures are snapped onto dental abutments. However, embodiments of the apparatus and method described herein offer a primarily horizontal attachment mechanism. The variation in sizing between the first section 212A and the second section 212B of the channel aperture 210 allows the denture abutment retention apparatus 200 to be placed over (or under) a dental abutment in a user's mouth, lowered (or raised) so that the head of the dental abutment is inserted into the first zone 206A of the channel 204, and horizontally slid toward the back of a user's mouth so that the head of the dental abutment is trapped under the narrower second section 212B of the aperture 210, thereby attaching the denture abutment retention apparatus 200 to a dental abutment. Preferably, four denture abutment retention apparatuses (such as, for example, denture abutment retention apparatuses 100A, 100B, 100C and 100D) are attached to a denture—two on either side of the denture—to form the dental apparatus 104 as shown in FIG. 1. The dental apparatus is then preferably secured to a user's mouth using the steps described above for each side of the denture substantially simultaneously.

Denture abutment retention apparatuses described herein such as, for example, denture abutment retention apparatus 200, are preferably attached to a denture or formed as part of a denture by using adhesives, mechanical connection/retention, 3D printing the denture, using milled bars of metal or polymer, or other means in which the denture abutment retention apparatus is either attached to or formed in a denture. In a preferred embodiment, the denture abutment retention apparatuses are formed as a part of the denture and acrylic of the denture solidifies around at least a portion of the denture abutment retention apparatuses to hold them in place. A method for making a denture including such denture abutment retention apparatuses includes solidifying an acrylic composition around a plurality of denture abutment retention apparatuses as shown and described herein wherein the first sides 208 and apertures 210 are exposed. In another embodiment, spaces are left in the acrylic of a denture body wherein the denture abutment retention apparatuses are inserted into the spaces and attached to the denture using an adhesive or other mechanical attachment means. A method for making a denture including denture abutment retention apparatuses described herein includes solidifying an acrylic composition in the shape of a denture with a plurality of cavities in the solidified acrylic composition; attaching denture abutment retention apparatuses in the cavities with one denture abutment retention apparatus per cavity. Preferably, the denture abutment retention apparatuses are embedded into a denture body with only the first sides 208 and the apertures 210 exposed. The various method steps described above can be used with various embodiments of denture abutment retention apparatuses shown and described herein.

In the embodiment shown in FIGS. 2A-2C, the first section 212A of the aperture 210 is a round shape having a radius $R_1$ preferably from about 1 mm to about 2 mm, more preferably from about 1.25 mm to about 1.75 mm, and most preferably from about 1.4 mm to about 1.6 mm. The term "about" when referring to length is defined as plus or minus 0.15 millimeters (mm). The length $L_1$ of the channel 204 preferably ranges from about 4 mm to about 7 mm, more preferably from about 5 mm to about 6 mm, and most preferably about 5.3 mm to about 5.7 mm. The thickness $T_1$ of the walls 216 of the denture abutment retention apparatus body is preferably about 0.5 mm but can vary in different embodiments. The height $H_1$ of the channel 204 preferably ranges from about 1.25 mm to about 1.75 mm and more preferably is about 1.5 mm. The second section 212B of the aperture 210 is shown in the shape of a triangle terminating at a point 214. A neck of a dental abutment is preferably slide from the first section 212A to the second section 212B of the aperture 210 so that the neck is wedged in the denture abutment retention apparatus body 202 along the second section 212B of the aperture 210 and wherein the head of an abutment is located in the second zone 206B under the second section 212B of the aperture 210. The triangle shape of the section 212B of the aperture 210 allows for the neck of a dental abutment to be wedged and secured in place. The channel 204 is preferably in the shape of a rectangular parallelepiped wherein such shape is defined by the orientations of the walls 216 of the denture abutment retention apparatus body 202. Internal wall structures are shown using large dashed lines and the first zone 206A and a second zone 206B are shown and defined using small dashed lines.

Figure 4B:
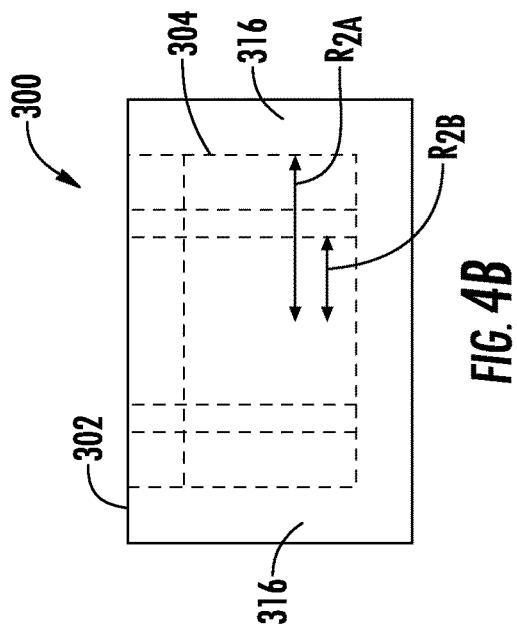
FIG. 4B shows a drawing of an end view of the denture abutment retention apparatus shown in FIG. 4A.
Figure 4C:
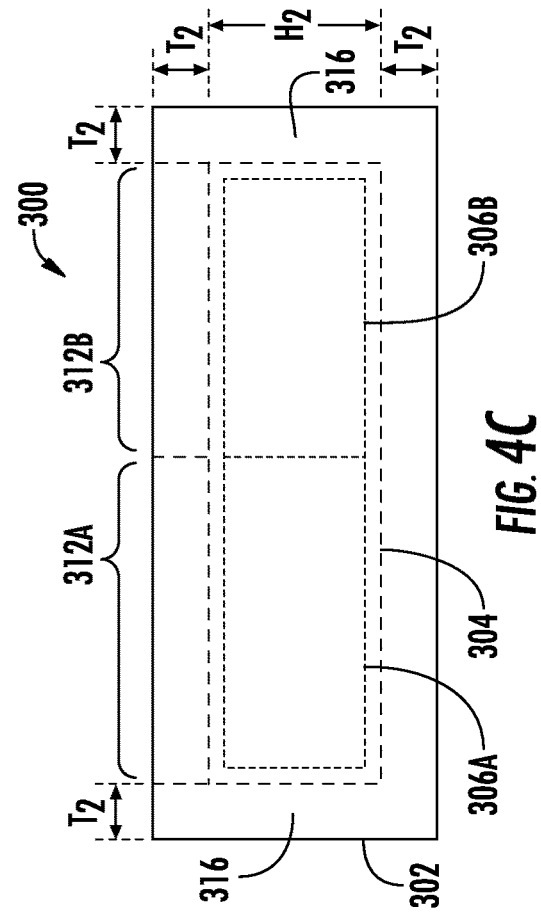
FIG. 4C shows a drawing of a side view of the denture abutment retention apparatus shown in FIG. 4A and FIG. 4B.
Figure 4A:
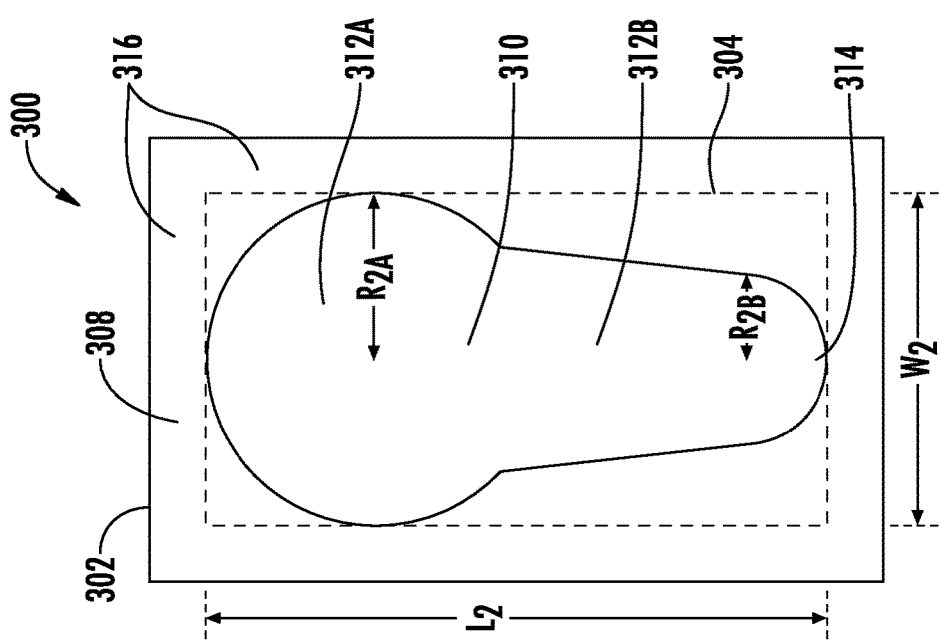
FIG. 4A shows a drawing of a plan view of denture abutment retention apparatus.

FIGS. 4A-4C show a similar embodiment including a denture abutment retention apparatus 300. The apparatus 300 includes a denture abutment retention apparatus body 302 and a channel 304 similar to the channel 204. The channel 304 includes a first zone 306A and a second zone 306B. The channel 304 is exposed to the surroundings along a first side 308 of the apparatus body 302. The exposed section is in the form of an aperture 310 including a first section 312A and a second section 312B. Instead of being in the shape of a triangle and terminating at a point like the point 214 described and shown above in FIG. 2A, the apparatus 300 shown in FIG. 3A includes the second section 312B of the aperture 310 tapering down to a rounded end 314. The rounded end 314 preferably has a radius $R_{2B}$ ranging from about 0.5 mm to about 1 mm. The other dimensions discussed above for the denture abutment retention apparatus 200 are very similar to or the same as the dimensions for the denture abutment retention apparatus 300 shown in FIG. 4A including a length $L_2$ of the channel 304, a width $W_2$ of the channel 304, a radius $R_{2A}$ of the first section 312A of the aperture 310, a thickness $T_2$ of the walls 316, and a height $H_2$ of the channel 304. The function of the various features is also effectively the same, providing a mechanism to secure a head of a dental abutment in the second zone 306B under the second section 312B of the aperture 310, thereby locking a denture in place in a user's mouth. The channel 304 is preferably in the shape of a rectangular parallelepiped wherein such shape is defined by the orientations of the walls 316 of the denture abutment retention apparatus body 302. The apparatus 300 is preferably used with ball-type dental abutments such as the one shown in FIG. 3. Internal wall structures are shown using large dashed lines and the first zone 306A and a second zone 306B are shown and defined using small dashed lines.

Figure 5B:
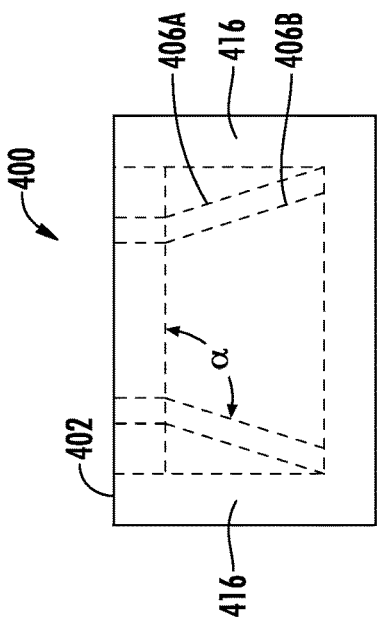
FIG. 5B shows a drawing of an end view of the denture abutment retention apparatus shown in FIG. 5A.
Figure 5C:
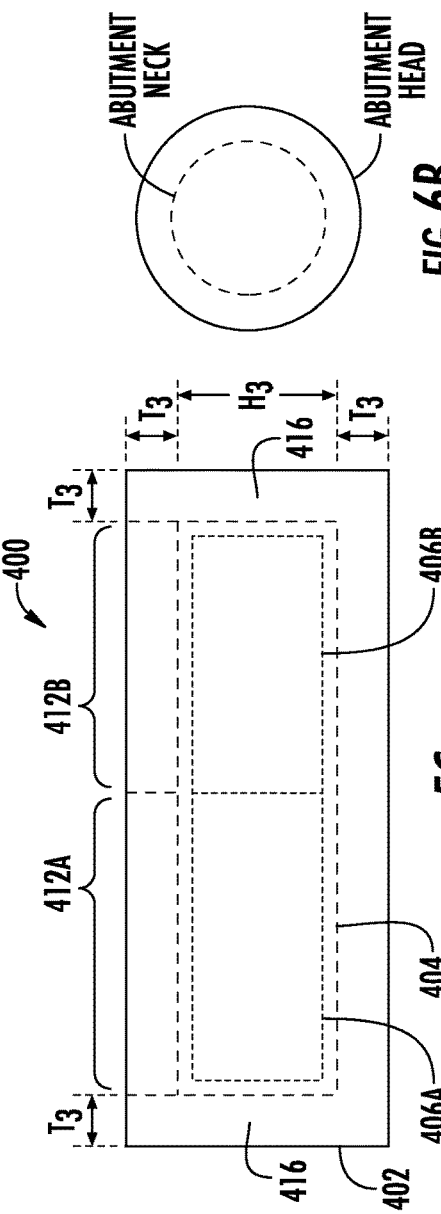
FIG. 5C shows a drawing of a side view of the denture abutment retention apparatus shown in FIG. 5A and FIG. 5B.
Figure 5A:
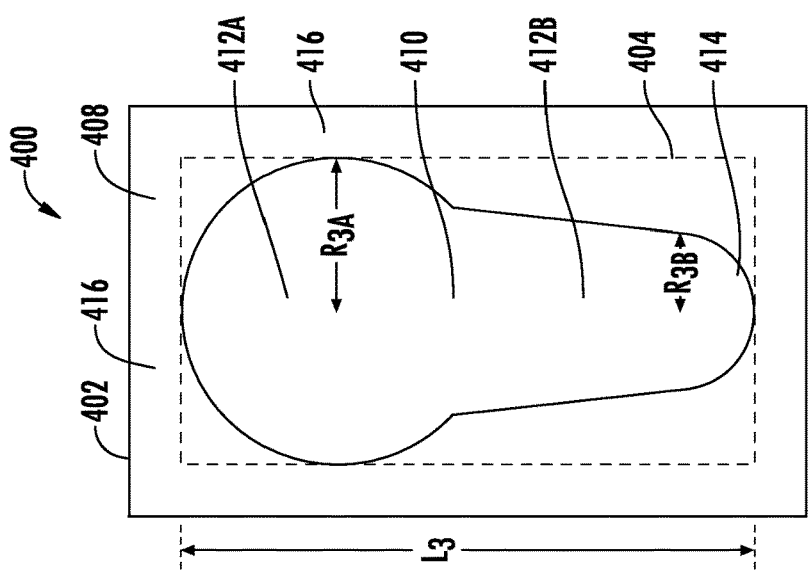
FIG. 5A shows a drawing of a plan view of denture abutment retention apparatus.

FIGS. 5A-5C show another embodiment including a denture abutment retention apparatus 400. The apparatus 400 includes a denture abutment retention apparatus body 402 and a channel 404 similar to the channel 204. The channel 404 includes a first zone 406A and a second zone 406B. The channel 404 is exposed to the surroundings along a first side 408 of the apparatus body 402. The apparatus body 402 is preferably shaped so that the second zone 406B angles outward at an angle α on both sides as shown in FIG. 5B. Angle α preferably ranges from about 90° to 130°, more preferably from about 100° to about 120°, and most preferably about 108°. The exposure of the channel 304 is made via an aperture 410 including a first section 412A and a second section 412B. Instead of being in the shape of a triangle and terminating at a point like the point 214 described and shown above in FIG. 2A, the apparatus 400 shown in FIG. 5A includes the second section 412B of the aperture 410 tapering down to a rounded end 414. The rounded end 414 preferably has a radius $R_{3B}$ ranging from about 0.5 mm to about 1 mm. The other dimensions discussed above for the denture abutment retention apparatus 200 are very similar to or the same as the dimensions for the denture abutment retention apparatus 400 shown in FIGS. 5A-5C including a length $L_3$ of the channel 404, a width $W_3$ of the channel 404, a radius $R_{3A}$ of the first section 412A of the aperture 410, a thickness $T_3$ of the walls 416 of the denture abutment retention apparatus body 402, and a height $H_3$ of the channel 404. The channel 404 is preferably in the shape of a rectangular parallelepiped wherein such shape is defined by the orientations of the walls 416 of the denture abutment retention apparatus body 402. Internal wall structures are shown using large dashed lines and the first zone 406A and a second zone 406B are shown and defined using small dashed lines.

Figure 6A:
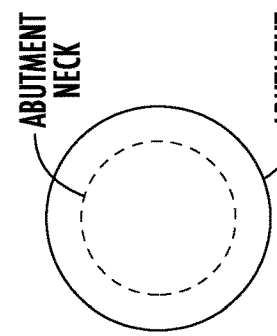
FIG. 6A shows a side view of a denture abutment for use with the denture abutment retention apparatus shown in FIGS. 5A-5C.
Figure 6B:
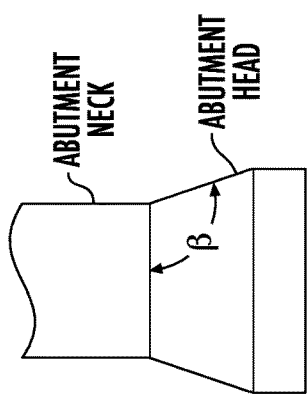
FIG. 6B shows a plan view of the denture abutment shown in FIG. 6A.

The function of the various features is also effectively the same, providing a mechanism to secure a head of a dental abutment in the second zone 406B under the second section 412B of the aperture 410, thereby locking a denture in place in a user's mouth. The apparatus 400 is preferably used with a cone-type dental abutment such as the one shown in FIG. 6A and FIG. 6B showing an abutment head angled at an angle β and an abutment neck. Angle β preferably ranges from about 90° to 130°, more preferably from about 100° to about 120°, and most preferably about 108° which corresponds with angle α in the second zone 406B so that cone-type abutments can fit snug inside the second zone 406B.

Figure 7B:
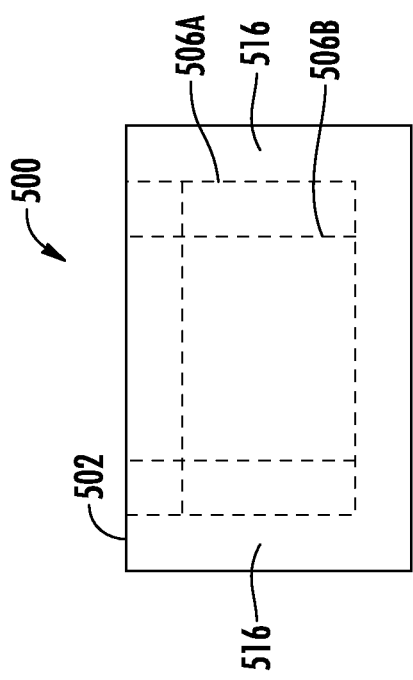
FIG. 7B shows a drawing of an end view of the denture abutment retention apparatus shown in FIG. 7A.
Figure 7C:
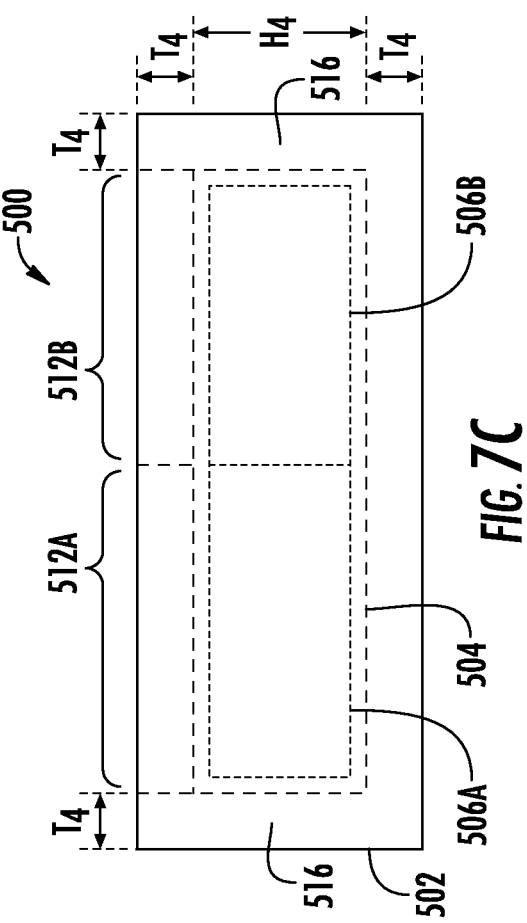
FIG. 7C shows a drawing of a side view of the denture abutment retention apparatus shown in FIG. 7A and FIG. 7B.
Figure 7A:
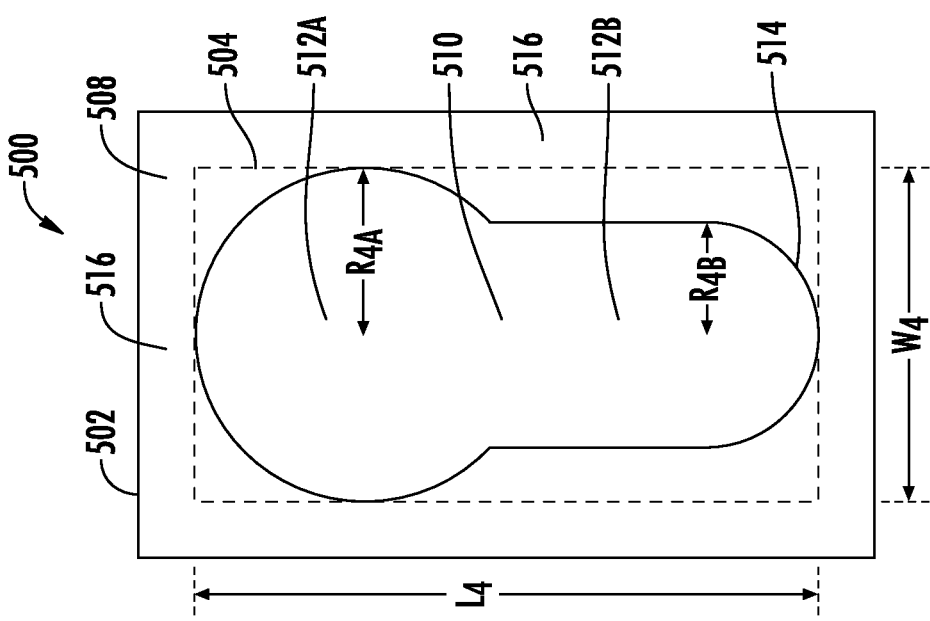
FIG. 7A shows a drawing of a plan view of denture abutment retention apparatus.

FIGS. 7A-7C show a similar embodiment including a denture abutment retention apparatus 500. The apparatus 500 includes a denture abutment retention apparatus body 502 and a channel 504 similar to the channel 204. The channel 504 includes a first zone 506A and a second zone 506B. The channel 504 is exposed to the surroundings along a first side 508 of the apparatus body 502. The exposure of the channel 504 is made via an aperture 510 including a first section 512A and a second section 512B. Instead of being in the shape of a triangle and terminating at a point like the point 214 described and shown above in FIG. 2A, the apparatus 500 shown in FIG. 7A includes the second section 512B of the aperture 510 extending straight down to a rounded end 514. The rounded end 514 preferably has a radius $R_{4B}$ ranging from about 0.75 mm to about 1.25 mm. The other dimensions discussed above for the denture abutment retention apparatus 200 are very similar to or the same as the dimensions for the denture abutment retention apparatus 500 shown in FIGS. 7A-7C including a length $L_4$ of the channel 504, a width $W_4$ of the channel 504, a radius $R_{4A}$ of the first section 512A of the aperture 510, a thickness $T_4$ of the walls 516 of the denture abutment retention apparatus body 502, and a height $H_4$ of the channel 504. The channel 504 is preferably in the shape of a rectangular parallelepiped wherein such shape is defined by the orientations of the walls 516 of the denture abutment retention apparatus body 502. Internal wall structures are shown using large dashed lines and the first zone 506A and a second zone 506B are shown and defined using small dashed lines.

The function of the various features is also effectively the same, providing a mechanism to secure a head of a dental abutment in the second zone 506B under the second section 512B of the aperture 510, thereby locking a denture in place in a user's mouth. The apparatus 500 is preferably used with ball-type dental abutments such as the one shown in FIG. 3.

Figure 8B:
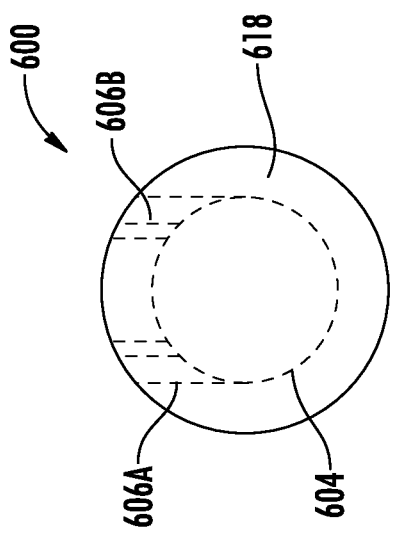
FIG. 8B shows a drawing of an end view of the denture abutment retention apparatus shown in FIG. 8A.
Figure 8C:
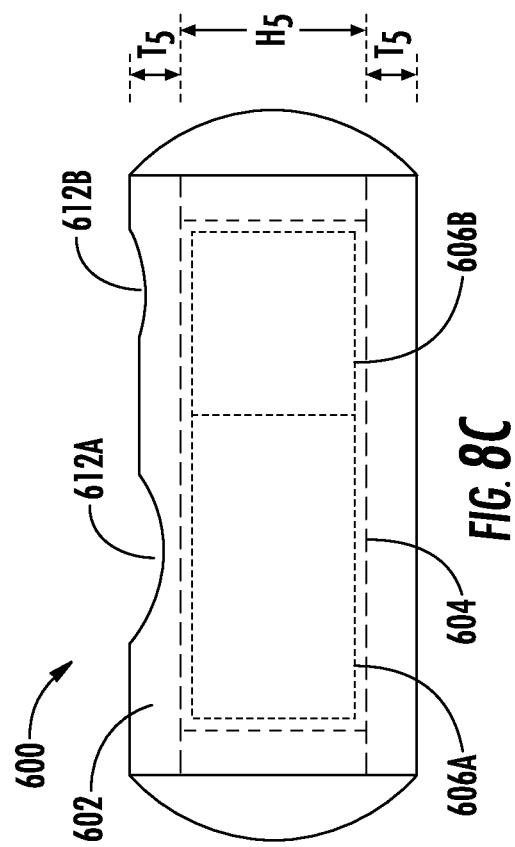
FIG. 8C shows a drawing of a side view of the denture abutment retention apparatus shown in FIG. 8A and FIG. 8B.
Figure 8A:
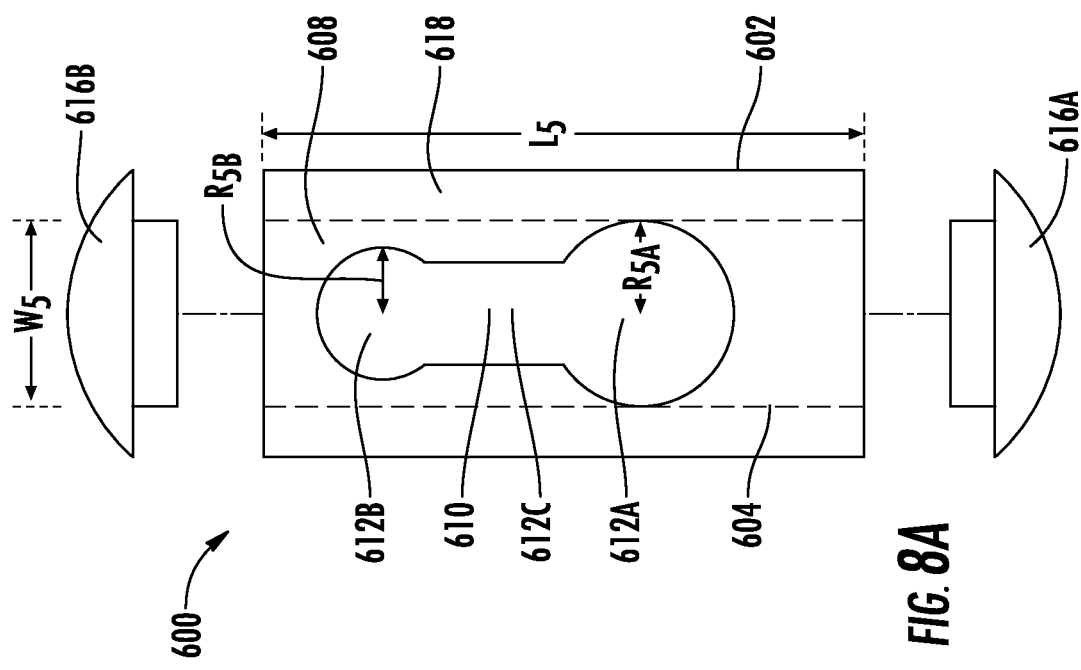
FIG. 8A shows a drawing of a plan view of denture abutment retention apparatus.

FIGS. 8A-8C show a similar embodiment including a denture abutment retention apparatus 600. The apparatus 600 includes a denture abutment retention apparatus body 602 and a channel 604 extending inside the body 602. The channel 604 includes a first zone 606A and a second zone 606B. The channel 604 is exposed to the surroundings along a first side 608 of the apparatus body 602. The exposed section is in the form of an aperture 610 including a first section 612A, a second section 612B, and an intermediate narrow band 612C. The first section 612A is preferably round with a radius $R_{5A}$ and is where a head of an abutment can be inserted. Radius $R_{5A}$ preferably ranges from about 1.3 mm to about 1.5 mm. The second section 612B of the aperture 610 preferably has a radius $R_{5B}$ ranging from about 0.85 mm to about 1.15 mm. The denture abutment retention apparatus shown in FIGS. 8A-8C is preferably in the shape of an elongated capsule including a first end piece 616A and a second end piece 616B, each of which can be partially lodged within the channel 604 of the denture abutment retention apparatus body 602. The other dimensions discussed above for the denture abutment retention apparatus 500 are very similar to or the same as the dimensions for the denture abutment retention apparatus 600 shown in FIGS. 8A-8C including a length $L_5$ of the channel 604, a width $W_5$ of the channel 604, a radius $R_{5A}$ of the first section 612A of the aperture 610, a thickness $T_5$ of the walls 618 of the denture abutment retention apparatus body 602, and a height $H_5$ of the channel 604. The channel 504 is preferably in the shape of a cylinder. Internal wall structures are shown using large dashed lines and the first zone 606A and a second zone 606B are shown and defined using small dashed lines.

The function of the various features includes providing a mechanism to secure a head of a dental abutment in the second zone 606B under the second section 612B of the aperture 610, thereby locking a denture in place in a user's mouth. The apparatus 600 is preferably used with ball-type dental abutments such as the one shown in FIG. 3. The necks of such abutments can be passed through the intermediate narrow band 612C of the aperture 610 and, due to the narrowness of the intermediate narrow band 612C, snapped into the second section 612B of the aperture 610. The size of the second section 612B of the aperture 610 is such that a ball of an abutment is free to rotate in the second zone 606B like a ball in a socket but wherein the ball is prevented from passing through the second section 612B of the aperture 610, with the head of the abutment held in place in the second zone 606B of the channel 604.

Figure 10A:
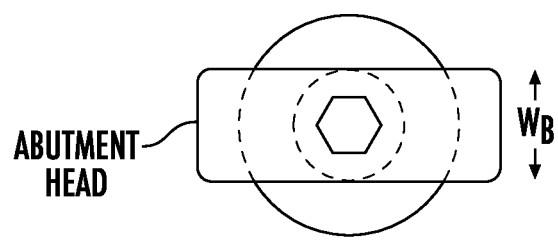
FIG. 10A shows a plan view of a denture abutment.
Figure 10B:
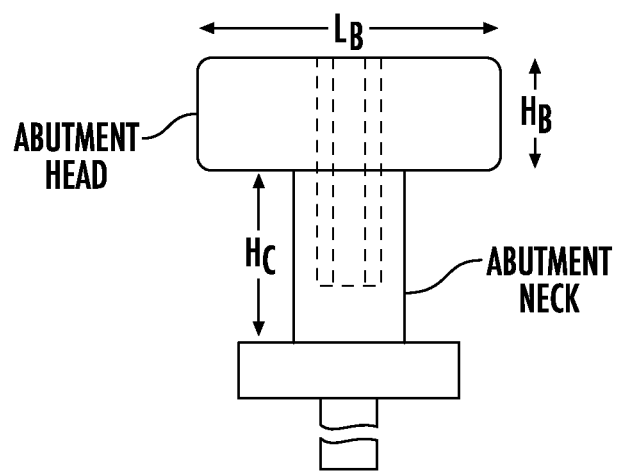
FIG. 10B shows a side view of the denture abutment shown in FIG. 10A.

FIGS. 9A-9C show an embodiment of a denture abutment retention apparatus 700. The apparatus 700 includes a denture abutment retention apparatus body 702 and a channel 704 extending inside the body 702. The channel 704 includes a first zone 706A and a second zone 706B. The channel 704 is exposed to the surroundings along a first side 708 of the apparatus body 702. The exposed section is in the form of an aperture 710 including a first section 712A and a second section 712B. The first section 712A is preferably rectangular with a length $L_A$ preferably ranging from about 3.25 mm to about 3.75 mm and a width $W_A$ preferably ranging from about 1.15 mm to about 1.45 mm. The first section 712A of the aperture 710 is where a head of a T-shaped abutment can be inserted. An example of a T-shaped abutment is shown in FIG. 10 wherein the heads of such T-shaped abutments typically have a length $L_B$ of about 2.75 mm, a width $W_B$ of about 1 mm, and a height $H_B$ of about 1 mm. The necks of T-shaped abutments typically have a height $H_C$ of about 1.5 mm. Although examples of specific length, width, and height values are provided herein, other values for a different sized T-shaped abutment would work. The second section 712B of the aperture 710 includes a narrow first region 714A which leads to a slightly larger round second region 714B. The second region 714B of the second section 712B is preferably rounded and preferably has a radius $R_6$ ranging from about 0.5 mm to about 1 mm. The length $L_6$ of the channel preferably ranges from about 3.5 mm to about 4.5 mm; the width $W_6$ of the channel 704 preferably ranges from about 3.25 mm to about 3.75 mm; and the height $H_6$ of the channel 704 preferably ranges from about 1.25 mm to about 1.75 mm. The thickness $T_6$ of the walls 716 of the denture abutment retention apparatus body 702 is preferably about 0.5 mm but can vary in different embodiments. The channel 704 is preferably in the shape of a rectangular parallelepiped wherein such shape is defined by the orientations of the walls 716 of the denture abutment retention apparatus body 702. Internal wall structures are shown using large dashed lines and the first zone 706A and a second zone 706B are shown and defined using small dashed lines.

The function of the various features includes providing a mechanism to secure a head of a T-shaped dental abutment in the second zone 706B under the second region 714B of the second section 712B of the aperture 710, thereby locking a denture in place in a user's mouth. The apparatus 700 is preferably used with T-shaped dental abutments such as the one shown in FIG. 10. The necks of such abutments can be passed through the first region 714A of the second section 712B of the aperture 710 and snapped into the second region 714B of the second section 712B of the aperture 710, with the head of the abutment located in the second zone 706B of the channel 704.

Figure 11B:
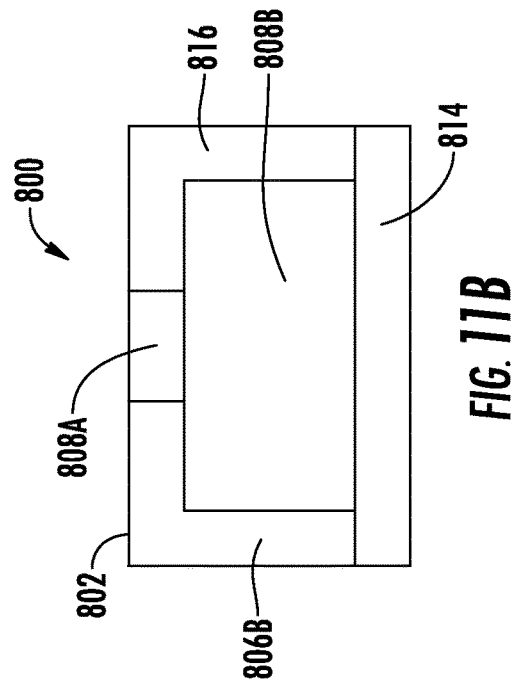
FIG. 11B shows a drawing of an end view of the denture abutment retention apparatus shown in FIG. 11A.
Figure 11C:
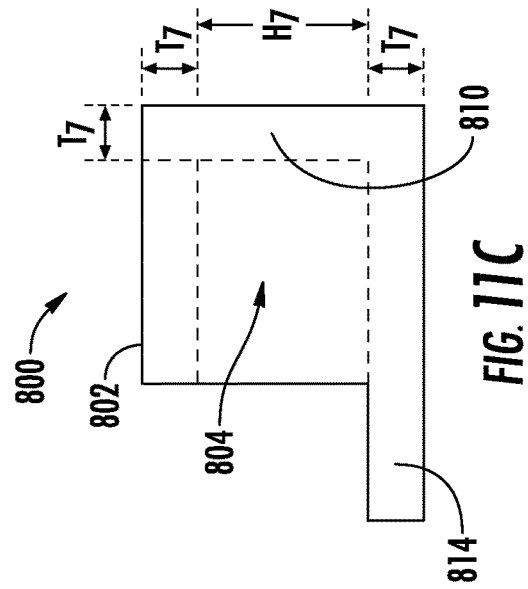
FIG. 11C shows a drawing of a side view of the denture abutment retention apparatus shown in FIG. 11A and FIG. 11B.
Figure 11A:
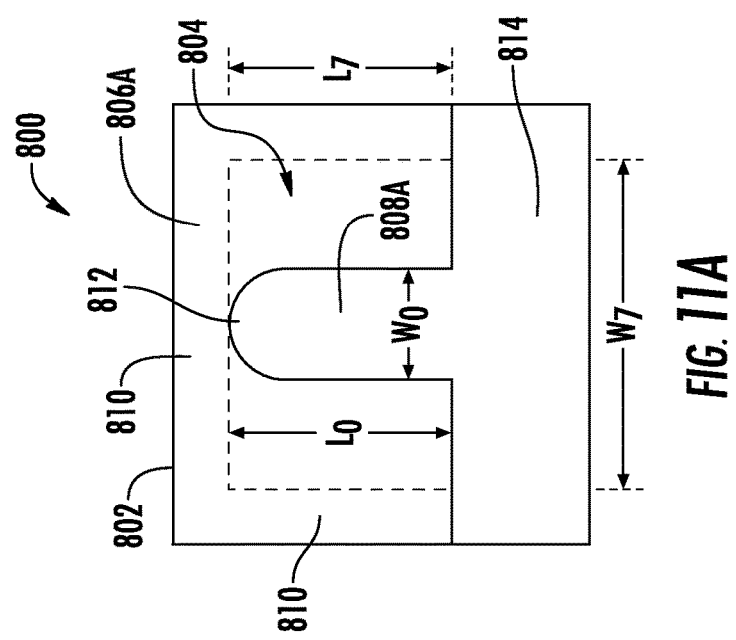
FIG. 11A shows a drawing of a plan view of denture abutment retention apparatus.

FIG. 11 shows an embodiment of a denture abutment retention apparatus 800 including a denture abutment retention apparatus body 802 defining a cavity 804 located inside the denture abutment retention apparatus body 802. The cavity 804 is open along a first side 806A of the denture abutment retention apparatus body 802 via a first opening 808A and is open along a second side 806B of the denture abutment retention apparatus body 802 via a second opening 808B. The width $W_7$ of the cavity 804 preferably ranges from about 2.5 mm to about 3.5 mm; the length $L_7$ of the cavity 804 preferably ranges from about 2.25 mm to about 2.75 mm, the height $H_7$ of the cavity 804 preferably ranges from about 1.25 mm to about 1.75 mm, and the thickness $T_7$ of the walls 810 of the denture abutment retention apparatus body 802 is preferably about 0.5 mm. The cavity 804 is preferably in the shape of a rectangular parallelepiped wherein such shape is defined by the orientations of the walls 810 of the denture abutment retention apparatus body 802. The shape of the cavity 804 is such that a head of T-shaped abutment (example shown in FIG. 10) can fit through the second opening 808B into the cavity 804 with a neck of such T-shaped abutment extending through the first opening 808A. When securing a denture to a person's mouth, the head of a T-shaped abutment is inserted through the second opening 808B and is slid into the cavity 804 until a neck of the T-shaped abutment reaches a far edge 812 of the first opening 808A, thereby locking a denture in place inside a person's mouth. The length $L_O$ of the first opening 808A preferably ranges from about 1.5 mm to about 2.5 mm and the width $W_O$ of the first opening 808A preferably ranges from about 0.75 mm to about 1.25 mm. The denture abutment retention apparatus body 802 preferably further includes a threshold 814 which extends beyond the second opening 808B. Internal wall structures are shown using large dashed lines.

Figure 12A:
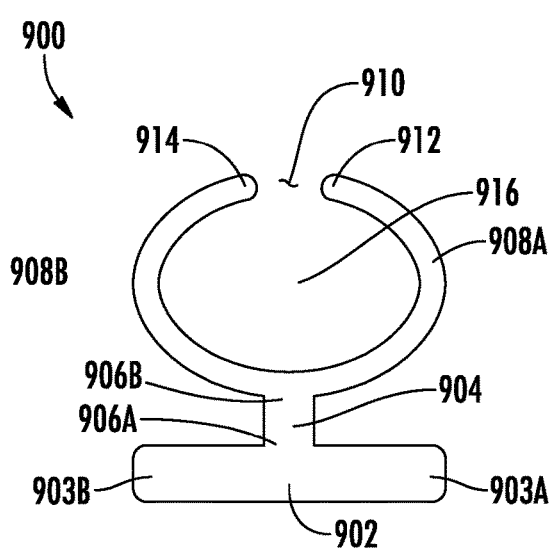
FIG. 12A shows a drawing of an end view of a denture abutment retention apparatus.
Figure 12B:
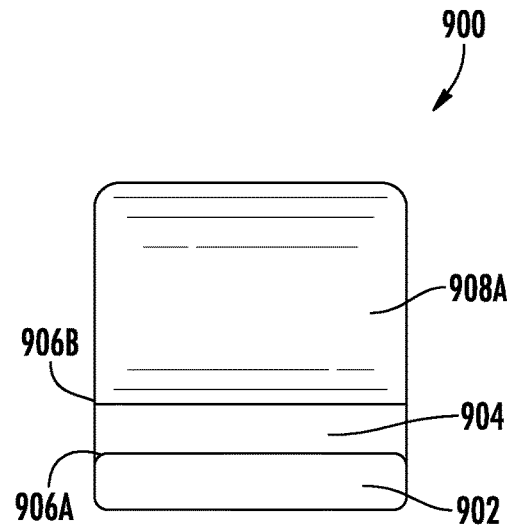
FIG. 12B shows a drawing of a side view of the denture abutment retention apparatus shown in FIG. 12A.
Figure 12C:
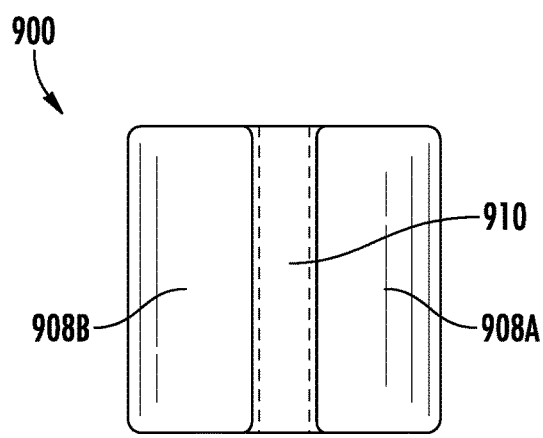
FIG. 12C shows a drawing of a plan view looking into the denture abutment retention apparatus of FIG. 12A and FIG. 12B.
Figure 12D:
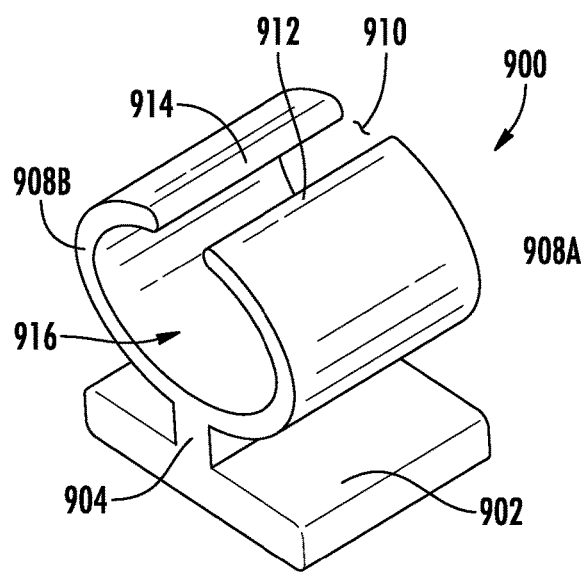
FIG. 12D shows a drawing of a perspective view of the denture abutment retention apparatus shown in FIGS. 12A-12C.

FIGS. 12A-12D show an embodiment of a denture abutment retention apparatus 900 including a base 902 including a first leg 903A and a second leg 903B, a neck 904 including a first end 906A and a second end 906B wherein the neck 904 is preferably oriented substantially orthogonal to the base 902, and a pair of arched arms 908 including a first arm 908A and a second arm 908B. The arched arms 908 extend from the second end 906B of the neck 904 preferably in opposite directions to form an almost complete circle or oval when viewing the denture abutment retention apparatus 900 from an end view as shown in FIG. 12A. There is a gap 910 between a distal end 912 of the first arm 908A and a distal end 914 of the second arm. The gap 910 is sized so that the neck of dental abutment will fit between the distal end 912 of the first arm 908 and the distal end 914 of the second arm 908B, preferably tightly, with the head of a dental abutment secured in an open space 916 between the first arm 908A and the second arm 908B. Preferably, multiple retention apparatuses like the denture abutment retention apparatus 900 are attached to a denture to aid with securing the denture to abutments in a person's mouth.

Figure 13:
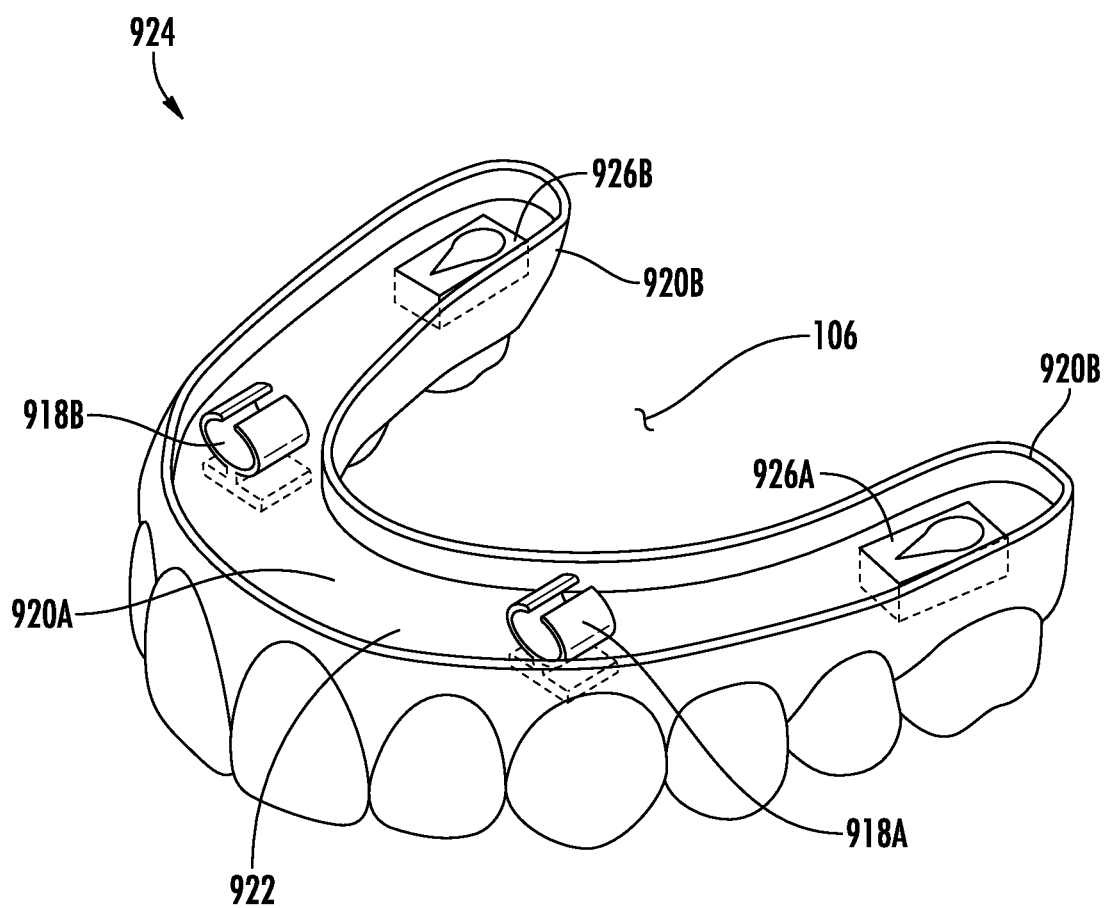
FIG. 13 shows a drawing of a set of two denture abutment retention apparatuses of a first type and a set of two denture abutment retention apparatuses of a second type attached to a denture, thereby forming a dental apparatus for engagement with abutments in a user's mouth.

In one embodiment shown in FIG. 13, a first denture abutment retention apparatus 918A and a second denture abutment retention apparatus 918B similar to or identical to the denture abutment retention apparatus 900 shown in FIGS. 12A-12D are attached on opposing sides along an anterior section 920A of a denture body 922 to form a dental apparatus 924. Additionally, a third denture abutment retention apparatus 926A and a fourth denture abutment retention apparatus 926B similar to or identical to the denture abutment retention apparatus shown in FIGS. 2A-2C are attached on opposing sides along a posterior section 920B of the denture body 922. The first denture abutment retention apparatus 918A and the second denture abutment retention apparatus 918B are preferably formed into the denture body 922 so that the necks and bases of the first denture abutment retention apparatus 918A and the second denture abutment retention apparatus 918B are preferably embedded into the denture body 922, thereby anchoring the first denture abutment retention apparatus 918A and the second denture abutment retention apparatus 918B to the denture body 922. Similarly, the third denture abutment retention apparatus 926A and the fourth denture abutment retention apparatus 926B are also preferably embedded into the denture body 922 so that the first sides 208 and apertures 210 of the third denture abutment retention apparatus 926A and the fourth denture abutment retention apparatus 926B are substantially flush with the surrounding denture body 922. Other versions and combinations of versions of denture abutment retention apparatuses described herein can be used. In some embodiments, only one denture abutment retention apparatus is used along the anterior section of a denture body with two denture abutment retention apparatuses used on opposing sides of a posterior section of a denture body.

The denture abutment retention apparatuses described herein are preferably made of metal. Such metal preferably includes 6-4 ELI titanium or 316/304 stainless steel. The denture abutment retention apparatuses described herein are preferably attached to or otherwise placed in acrylic dentures. Preferably, two denture abutment retention apparatuses are located toward the posterior section of a denture, one per side as shown, for example, in FIG. 1 and FIG. 13. Preferably, two denture abutment retention apparatuses are located toward the anterior section of a denture, one per side as also shown in FIG. 1 and FIG. 13. Although the use of four denture abutment retention apparatuses per denture are preferred, other embodiments may include two, three, five, six or more denture abutment retention apparatuses.

The previously described embodiments of the present disclosure have many advantages to users of such devices including increased hygiene, improved speech, greater tongue space, and reduced cost. Compared to traditional implant systems, embodiments described herein improve hygiene because a user can remove the denture independently (without help from a dental professional) to completely clean in and around implants and clean the denture outside the oral cavity. In implant retained systems, the patient must clean the denture in place resulting in food becoming trapped in and around the denture. Only a dentist can remove traditional implant-retained dentures for a complete cleaning, usually on an annual basis.

Embodiments of the apparatus described herein will also improve a user's speech compared to conventional dentures. Dentures used with embodiments of denture abutment retention apparatuses described herein use significantly less acrylic and have an open center section 106. Therefore, the dentures do not include a web between the sides of the denture and, therefore, do not cover the roof of the mouth of a user. This allows a user's tongue to move in natural positions and natural patterns. In conventional dentures, the roof of the mouth of a user is covered with acrylic, impeding natural tongue movements needed for ease of speech.

In addition to having less overall acrylic than traditional dentures, dentures used with embodiments of the denture abutment retention apparatus described herein have no flange on the lingual (tongue) side of the denture. The lack of acrylic on the lingual side improves user speech compared to conventional and implant dentures. This feature increases space in the intra-oral cavity improving the ability of a user to eat and drink with ease and enhancing the ability to taste food. The lack of a lingual-side flange also increases the passage of air through the airway of a user and enhances comfort by allowing natural tongue movements.

As an additional advantage, the cost to users should be less than for traditional implant-retained dentures. In traditional hybrid denture systems, a patient (prior to being a user) must have multiple appointments to "try-in" the denture at various stages of development. The repeated "try-ins" are partially due to the need for milling a titanium bar (which costs several thousand dollars) or using zirconia (at an even higher price) which is labor-intensive and prone to cracking. The apparatus and method described herein require only one additional appointment over traditional denture fabrication. With fewer visits required of the patient and dentist and fewer tedious and intricate steps to the process, the embodiments of the apparatus described herein can be fabricated more easily and with fewer opportunities for errors than traditional implant systems. Patients will receive a better-quality denture system for a lower cost than currently provided by the dental community. The decreased cost should increase the number of patients who can afford to receive the dental care they need.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

Any element in a claim that does not explicitly state "means for" performing a specified function, or "step for" performing a specific function, is not to be interpreted as a "means" or "step" clause as specified in 35 U.S.C. § 112, ¶ 6. In particular, the use of "step of" in the claims herein is not intended to invoke the provisions of 35 U.S.C. § 112, ¶ 6.

What is claimed is:

1. A denture abutment retention apparatus for securing a denture to a denture abutment, the denture abutment retention apparatus comprising:
   a. a denture abutment retention apparatus body comprising a plurality of sides wherein the plurality of sides include a first side which comprises an aperture therethrough;
   b. a channel located inside the denture abutment retention apparatus body and open to the first side of the denture abutment retention apparatus body via the aperture, the channel further comprising a first zone and a second zone, and the aperture further comprising a first section and a second section wherein the first section is wider than the second section;
   wherein the aperture and channel are configured to (i) allow a head of a dental abutment to fit through the first section of the aperture and into the first zone of the channel, (ii) allow the head of the dental abutment to be slid horizontally to the second zone of the channel under the second section of the aperture, and (iii) prevent the head of the dental abutment from fitting through the second section of the aperture to escape the channel; and
   wherein the first section of the aperture comprises a round shape and wherein the second section of the aperture comprises a triangular shape terminating at a point to allow a neck of a dental abutment to be wedged into the denture abutment retention apparatus body along the second section of the aperture after being inserted into the first section of the aperture and slid toward the second section of the aperture.

2. A denture comprising:
   a. a denture body, a first denture abutment retention apparatus connected to the denture body, and a second denture abutment retention apparatus connected to the denture body wherein each of the first denture abutment retention apparatus and the second denture abutment retention apparatus comprises:
      i. a denture abutment retention apparatus body comprising a plurality of sides wherein the plurality of sides include a first side which comprises an aperture therethrough;
      ii. a channel located inside the denture abutment retention apparatus body and open to the first side of the denture abutment retention apparatus body via the aperture, the channel further comprising a first zone and a second zone, and the aperture further comprising a first section and a second section wherein the first section is wider than the second section; wherein the aperture and the channel are configured to (i) allow a head of a dental abutment to fit through the first section of the aperture into the first zone of the channel, (ii) allow the head of the dental abutment to be slid horizontally to the second zone of the channel under the second section of the aperture, and (iii) prevent the head of the dental abutment from fitting through the second section of the aperture to escape the channel; and
   wherein the denture does not include a flange on a lingual side of the denture.

3. The denture of claim 2 wherein the first denture abutment retention apparatus and the second denture abutment retention apparatus are at least partially embedded in a posterior section of the denture body.

4. The denture of claim 2 further comprising:
a. a third denture abutment retention apparatus connected to the denture body and a fourth denture abutment retention apparatus connected to the denture body wherein each of the third denture abutment retention apparatus and the fourth denture abutment retention apparatus comprises:
   i. a base;
   ii. a neck including a first neck end and a second neck end wherein the neck is connected to the base along the first neck end; and
   iii. a pair of arched arms connected to and extending from the neck, the pair of arched arms comprising a first arched arm including a first arched arm distal end and a second arched arm including a second arched arm distal end, wherein the pair of arched arms form an empty space between the first arched arm and the second arched arm, and a gap between the first arched arm distal end and the second arched arm distal end.

5. The denture of claim 4 wherein the third denture abutment retention apparatus and the fourth denture abutment retention apparatus are at least partially embedded in an anterior section of the denture body.

6. The denture of claim 2 comprising an open center section.

7. A denture comprising:
a. a denture body, a first denture abutment retention apparatus connected to the denture body, and a second denture abutment retention apparatus connected to the denture body wherein each of the first denture abutment retention apparatus and the second denture abutment retention apparatus comprises:
   i. a base;
   ii. a neck including a first neck end and a second neck end wherein the neck is connected to the base along the first neck end; and
   iii. a pair of arched arms connected to and extending from the neck, the pair of arched arms comprising a first arched arm including a first arched arm distal end and a second arched arm including a second arched arm distal end, wherein the pair of arched arms form an empty space between the first arched arm and the second arched arm, and a gap between the first arched arm distal end and the second arched arm distal end;
wherein the denture is configured for horizontal insertion and removal; and
wherein the denture does not include a flange on a lingual side of the denture.

8. The denture of claim 7 wherein the first denture abutment retention apparatus and the second denture abutment retention apparatus are at least partially embedded in the denture body.

9. The denture of claim 8 comprising an open center section.

* * * * *